(12) United States Patent
Kelsen et al.

(10) Patent No.: US 8,910,198 B2
(45) Date of Patent: Dec. 9, 2014

(54) MULTICAST VIDEO ADVERTISEMENT INSERTION USING ROUTING PROTOCOLS

(75) Inventors: Michael S. Kelsen, Centreville, VA (US); Kevin Noll, Leesburg, VA (US); Howard Pfeffer, Reston, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 815 days.

(21) Appl. No.: 12/792,281

(22) Filed: Jun. 2, 2010

(65) Prior Publication Data
US 2011/0302600 A1 Dec. 8, 2011

(51) Int. Cl.
| | |
|---|---|
| *H04N 7/10* | (2006.01) |
| *H04N 7/025* | (2006.01) |
| *H04N 21/222* | (2011.01) |
| *H04N 21/44* | (2011.01) |
| *H04N 21/462* | (2011.01) |
| *H04N 21/81* | (2011.01) |
| *H04N 21/61* | (2011.01) |
| *H04N 21/643* | (2011.01) |
| *H04N 21/6405* | (2011.01) |

(52) U.S. Cl.
CPC ..... *H04N 21/44016* (2013.01); *H04N 21/2221* (2013.01); *H04N 21/64322* (2013.01); *H04N 21/4622* (2013.01); *H04N 21/812* (2013.01); *H04N 21/6118* (2013.01); *H04N 21/6405* (2013.01)
USPC .............................. 725/32; 709/239; 370/351

(58) Field of Classification Search
USPC ....................... 725/143–149, 32–36; 709/231, 709/238–244; 370/351–430
See application file for complete search history.

(56) References Cited

U.S. PATENT DOCUMENTS

| | | | |
|---|---|---|---|
| 7,382,796 B2 | 6/2008 | Haberman | |
| 7,490,344 B2 | 2/2009 | Haberman | |
| 7,548,962 B2 | 6/2009 | Weber et al. | |
| 7,657,428 B2 | 2/2010 | Haberman | |
| 8,103,780 B2 * | 1/2012 | Maloo | .......................... 709/227 |
| 2001/0032333 A1 | 10/2001 | Flickinger | |
| 2002/0056093 A1 | 5/2002 | Kunkel | |
| 2002/0083439 A1 | 6/2002 | Eldering | |

(Continued)

OTHER PUBLICATIONS

Anonymous, Targeted Television Advertising—Visible World, downloading from http://www.visibleworld.com/ on Jul. 12, 2010.

(Continued)

*Primary Examiner* — Hunter B Lonsberry
*Assistant Examiner* — Patrick A Ryan
(74) *Attorney, Agent, or Firm* — Otterstedt, Ellenbogen & Kammer, LLP

(57) ABSTRACT

First video material is transmitted from a video source, over a video content network, to consumer premises equipment, via a hub router. The video source has a source address and there is a first path length between the hub router and the video source. Upon occurrence of a first triggering condition, a short route metric is announced from a supplemental video material server coupled to the hub router. The short route metric causes the hub router to perceive a second path length, between the hub router and the supplemental video material server, as shorter than the first path length. The supplemental video material server has a source address identical to the source address of the video source. Thus, the consumer premises equipment obtains supplemental video material from the supplemental video material server instead of first video material from the video source. Aspects of a system and a supplemental video material server are also disclosed.

33 Claims, 6 Drawing Sheets

(56) References Cited

U.S. PATENT DOCUMENTS

| | | |
|---|---|---|
| 2002/0087975 A1 | 7/2002 | Schlack |
| 2002/0123928 A1 | 9/2002 | Eldering |
| 2003/0056217 A1 | 3/2003 | Brooks |
| 2003/0208767 A1 | 11/2003 | Williamson et al. |
| 2003/0221191 A1 | 11/2003 | Khusheim |
| 2004/0010807 A1 | 1/2004 | Urdang et al. |
| 2004/0015999 A1 | 1/2004 | Carlucci et al. |
| 2004/0040035 A1 | 2/2004 | Carlucci et al. |
| 2004/0059625 A1 | 3/2004 | Schrader |
| 2004/0093394 A1 | 5/2004 | Weber |
| 2004/0103429 A1 | 5/2004 | Carlucci et al. |
| 2004/0148625 A1 | 7/2004 | Eldering |
| 2004/0158858 A1 | 8/2004 | Paxton |
| 2004/0210944 A1* | 10/2004 | Brassil et al. ............ 725/135 |
| 2004/0237102 A1 | 11/2004 | Konig |
| 2004/0244058 A1 | 12/2004 | Carlucci et al. |
| 2005/0018691 A1 | 1/2005 | Riedl et al. |
| 2005/0034171 A1 | 2/2005 | Benya |
| 2005/0060742 A1 | 3/2005 | Riedl |
| 2005/0120377 A1 | 6/2005 | Carlucci et al. |
| 2005/0216932 A1 | 9/2005 | Danker |
| 2005/0278761 A1 | 12/2005 | Gonder et al. |
| 2006/0047957 A1 | 3/2006 | Helms et al. |
| 2006/0122946 A1 | 6/2006 | Fahrny et al. |
| 2006/0130107 A1 | 6/2006 | Gonder et al. |
| 2006/0130113 A1 | 6/2006 | Carlucci et al. |
| 2006/0218604 A1 | 9/2006 | Riedl et al. |
| 2006/0271594 A1 | 11/2006 | Haberman |
| 2007/0074243 A1 | 3/2007 | Verhaegh |
| 2007/0101375 A1 | 5/2007 | Haberman |
| 2007/0107011 A1 | 5/2007 | Li |
| 2007/0136742 A1 | 6/2007 | Sparrell |
| 2007/0157228 A1 | 7/2007 | Bayer |
| 2007/0157231 A1 | 7/2007 | Eldering |
| 2007/0192192 A1 | 8/2007 | Haberman |
| 2007/0192193 A1 | 8/2007 | Haberman |
| 2007/0198349 A1 | 8/2007 | Haberman |
| 2007/0217436 A1 | 9/2007 | Markley et al. |
| 2007/0225996 A1 | 9/2007 | Haberman |
| 2007/0225997 A1 | 9/2007 | Haberman |
| 2007/0233571 A1 | 10/2007 | Eldering |
| 2007/0288309 A1 | 12/2007 | Haberman |
| 2008/0098212 A1 | 4/2008 | Helms et al. |
| 2008/0112405 A1 | 5/2008 | Cholas et al. |
| 2008/0177998 A1 | 7/2008 | Apsangi et al. |
| 2008/0307453 A1 | 12/2008 | Haberman |
| 2009/0094634 A1 | 4/2009 | Haberman |
| 2009/0133058 A1 | 5/2009 | Kouritzin |
| 2009/0150941 A1 | 6/2009 | Riedl et al. |
| 2009/0177542 A1 | 7/2009 | Haberman |
| 2010/0031285 A1 | 2/2010 | Haberman |
| 2010/0058378 A1 | 3/2010 | Feldman |
| 2010/0095323 A1 | 4/2010 | Williamson |
| 2010/0100906 A1 | 4/2010 | Flickinger |

OTHER PUBLICATIONS

Anonymous, Visible World Overview, downloaded from http://www.visibleworld.com/ on Jul. 12, 2010.

SCTE Announces New DPI Standardization Projects, News—Society of Cable Telecommunications Engineers, Aug. 9, 2004, pp. 1-2.

Society of Cable Telecommunications Engineers, Engineering Committee, Digital Video Subcommittee, America National Standard, ANSI/SCTE 35 2007, Digital Program Insertion Cuein.

\* cited by examiner

MULTICAST VIDEO ADVERTISEMENT INSERTION USING ROUTING PROTOCOLS

FIELD OF THE INVENTION

The present invention relates generally to communications systems and methods, and, more particularly, to video content networks and the like.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

Video on demand (VOD) systems allow users to select and watch video content over a network. Some VOD systems "stream" content for real-time viewing. Others "download" the content to a set-top box before viewing starts. Use of digital video recorders (DVRs), also known as personal video recorders (PVRs), such as the TiVo® device (registered mark of TiVo Brands LLC, Alviso, Calif.) and the R Replay TV® device (registered mark of Digital Networks North America Inc., Pine Brook, N.J.), is ubiquitous. Such devices may provide some benefits to TV viewers. For example, a prior art DVR allows a user to record his or her favorite TV programs for later review, and to exercise a season-pass-like option wherein every episode of his or her favorite program is recorded for some period. Such devices may automatically record programs for the user based on his or her viewing habits and preferences. The presentation of the recorded programming content can be manipulated by exercising rewind, pause, skip and/or fast-forward functions (hereinafter referred to as "trick mode" or "trick play" functions) furnished by the DVR.

A "network PVR (NPVR)" (also referred to as an NDVR (Network Digital Video Recorder)) service allows the user to perform the analogous DVR functions through use of a network, rather than via a local DVR at the user premises. Unlike a DVR device, the NPVR service allows a user to "reserve" past and future programs for his or her review, even if such reserved programs were not identified by the user before their broadcast. Note that an NDVR can be distinguished from a DVR in that the latter, storage of programs and the like is local to the DVR, while in the former (NDVR) case, such storage is at the server or head end level.

US Patent Application Publication 2004/0015999 of Carlucci et al. entitled "Program Storage, Retrieval, and Management Based on Segmentation Messages, discloses segmentation messages indicative of locations of upcoming events, such as the start and end of programs and program portions, and/or rights related to the programs and program portions, which are used by cable systems and the like to store programs and program portions for later retrieval and transmission to customers on request. Storage, retrieval and management of programming are thereby facilitated. The complete disclosure of US Patent Application Publication 2004/0015999 of Carlucci et al. is expressly incorporated herein by reference in its entirety for all purposes.

US Patent Application Publication 2004/0244058 of Carlucci et al. entitled "Programming content processing and management system and method," discloses a technique to effectively receive streaming multimedia content in digital form, parse and segment the received transport stream and process the segmented content. Such treatment of received programming content provides for efficient storage of such programming content, and effectively provides for access to such content by administrators of a broadband system as well as users of such systems. The complete disclosure of US Patent Application Publication 2004/0244058 of Carlucci et al. is expressly incorporated herein by reference in its entirety for all purposes.

Thus, certain aspects applicable to video content networks have been discussed. One additional aspect of the operation of a video content network involves the insertion of advertisements into and/or between programs.

SUMMARY OF THE INVENTION

Principles of the present invention provide techniques for multicast video advertisement insertion using routing protocols. In one aspect, an exemplary method includes the step of transmitting first video material, from a video source, over a video content network, to consumer premises equipment, via a hub router. The video source has a source address and there is a first path length between the hub router and the video source. An additional step includes, upon occurrence of a first triggering condition, announcing, from a supplemental video material server coupled to the hub router, a short route metric which causes the hub router to perceive a second path length, between the hub router and the supplemental video material server, as shorter than the first path length. The supplemental video material server has a source address identical to the source address of the video source. Thus, the consumer premises equipment obtains supplemental video material from the supplemental video material server instead of first video material from the video source.

In another aspect, an exemplary system includes a video source having a source address; a video content network; a hub router having a first path length to the video source; consumer premises equipment coupled to the video source over the video content network, via the hub router; and a supplemental video material server coupled to the hub router and having a source address identical to the source address of the video source. The video source is configured to transmit first video material, over the video content network, to the consumer premises equipment, via the hub router; and the supplemental video material server is configured to announce, upon occurrence of a first triggering condition, a short route metric which causes the hub router to perceive a second path length, between the hub router and the supplemental video material server, as shorter than the first path length, such that the consumer premises equipment obtains supplemental video material from the supplemental video material server instead of first video material from the video source.

In still another aspect, a supplemental video material server is provided for coupling, via a video content network, to a hub router, consumer premises equipment, and a video source. The supplemental video material server has a source address identical to a source address of the video source. The supplemental video material server includes a memory; at least one processor, coupled to the memory; and a tangible, computer-readable recordable storage medium, including computer usable program code, loadable into the memory and executable on the at least one processor. The computer usable program code is configured to cause the at least one processor to announce, upon occurrence of a first triggering condition, a short route metric which causes the hub router to perceive a second path length, between the hub router and the supplemental video material server, as shorter than a first path length, between the hub router and the video source, such that the consumer premises equipment coupled to the hub router obtains supplemental video material from the supplemental video material server instead of first video material from the video source.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

Techniques of the present invention can provide substantial beneficial technical effects. For example, one or more embodiments may provide one or more of the following advantages:

techniques to insert ads closer to customers but without the need to deploy additional equipment into the network provide consumers of multicast video streams with different supplemental video content (e.g., advertisements) associated with main video content (e.g., a program) without need to replicate stream many times for each group of consumers reduced bandwidth consumption a layer 3 implementation allowing multiple locations for ads to be inserted and/or a static list or file to control the insertion of the ads allow centralizing ad insertion devices to hardened facilities staffed with appropriately skilled technicians to support them These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
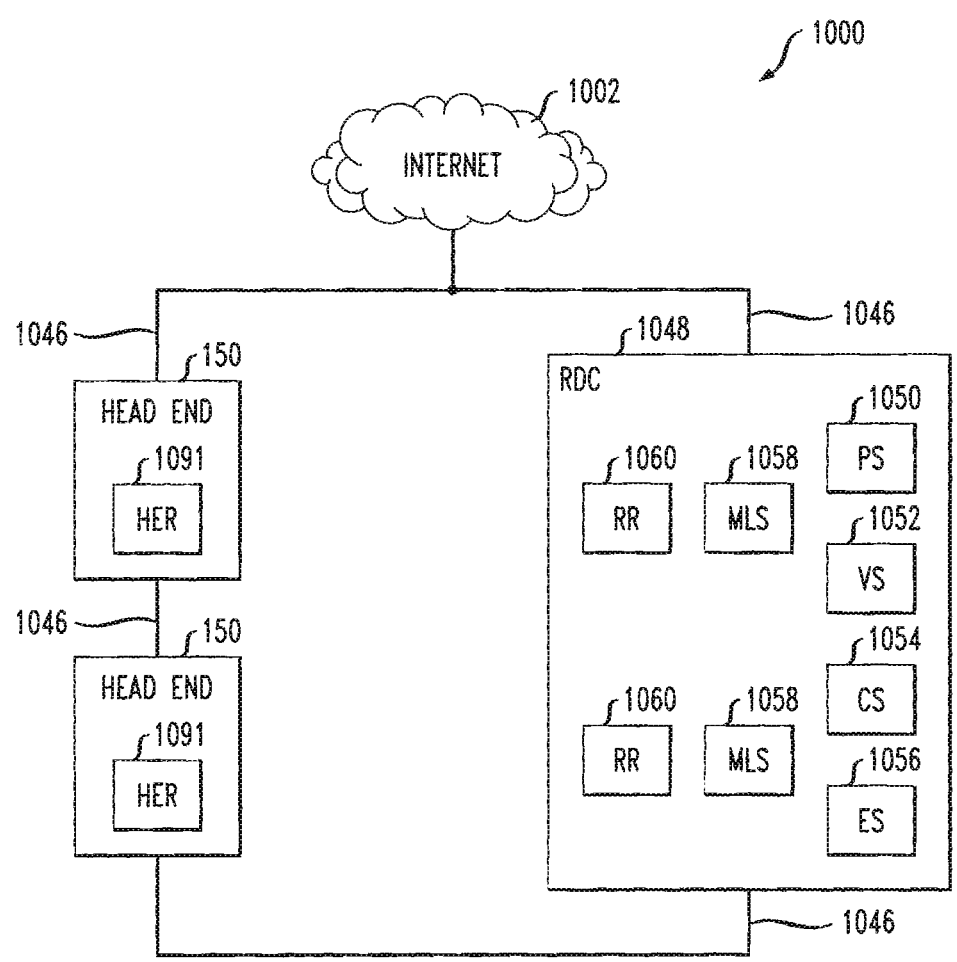
FIG. 1 is a block diagram of an exemplary embodiment of a system, within which one or more embodiments of the invention can be implemented.

FIG. 1 shows an exemplary system 1000, within which one or more embodiments of the invention can be implemented. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable multi-service operator (MSO), and may optionally be interconnected with a global system of interconnected computer networks that use the standardized Internet Protocol Suite (TCP/IP)(transfer control protocol/Internet protocol), commonly called the Internet 1002.

Head ends 150 may optionally each include a head end router (HER) 1091 which interfaces with network 1046. Head end routers 1091 are omitted from FIGS. 2-4 below to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

Note that optional components which may be used in networks which provide high speed data in addition to video content are illustrated for completeness but may be omitted in some instances.

Figure 2:
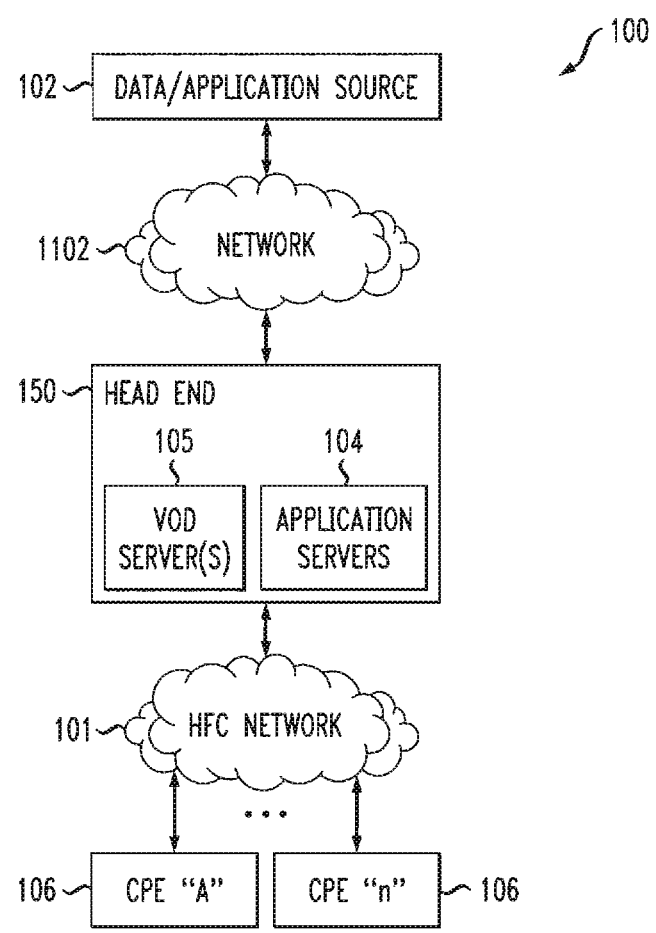
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within RDC 1048 or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes and high-speed cable modems for providing high bandwidth Internet access in premises such as homes and businesses.

Figure 3:
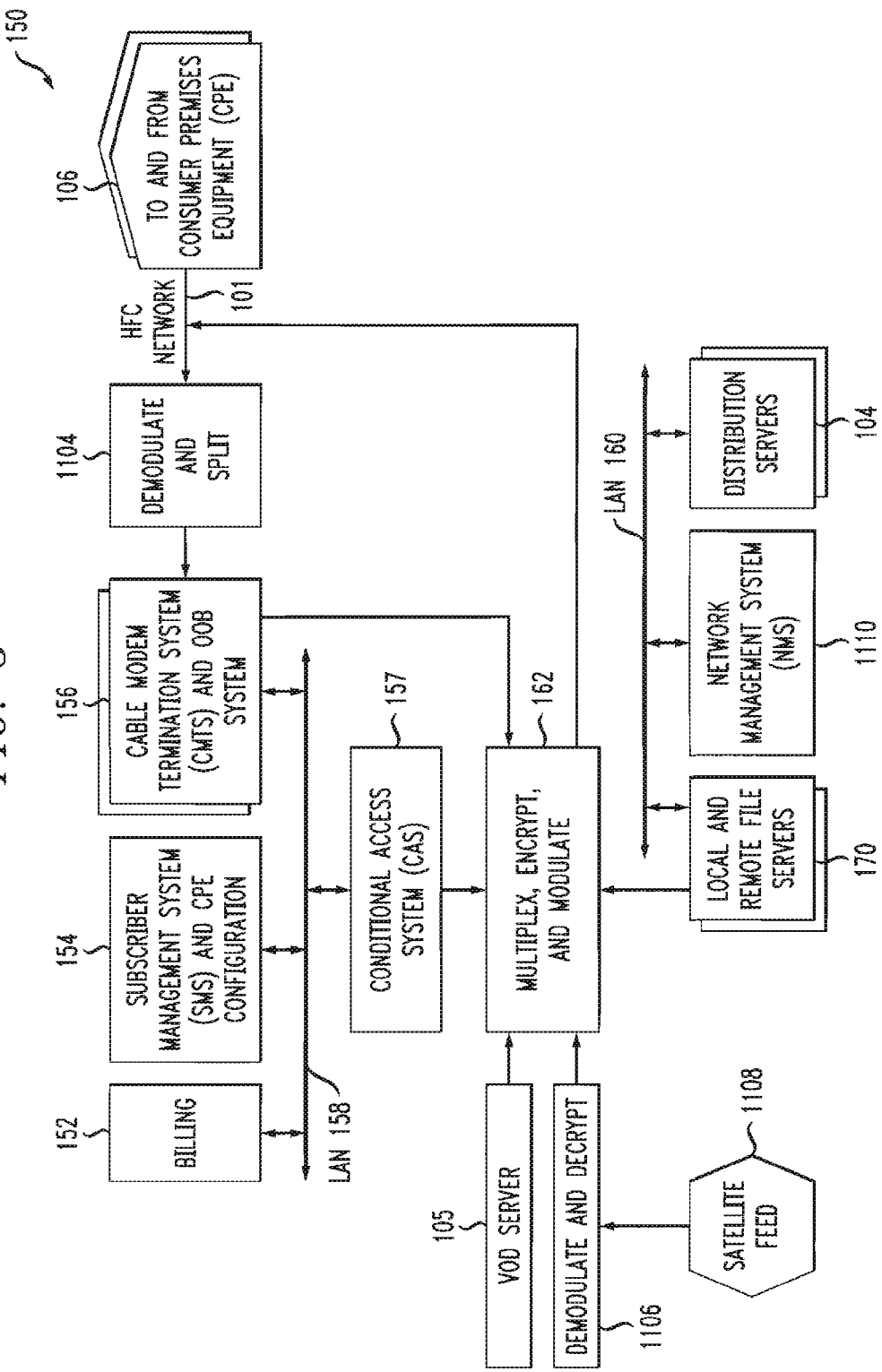
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as, for example, where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. The Data Over Cable System Interface Standard (DOCSIS® standard) was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and may be referred to elsewhere herein in capital letters, without the symbol, for convenience.

It will also be recognized that multiple servers (broadcast, VOD, or otherwise) can be used, and disposed at two or more different locations if desired, such as being part of different server "farms." These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1104 are fed to CMTS and OOB system 156.

Figure 4:
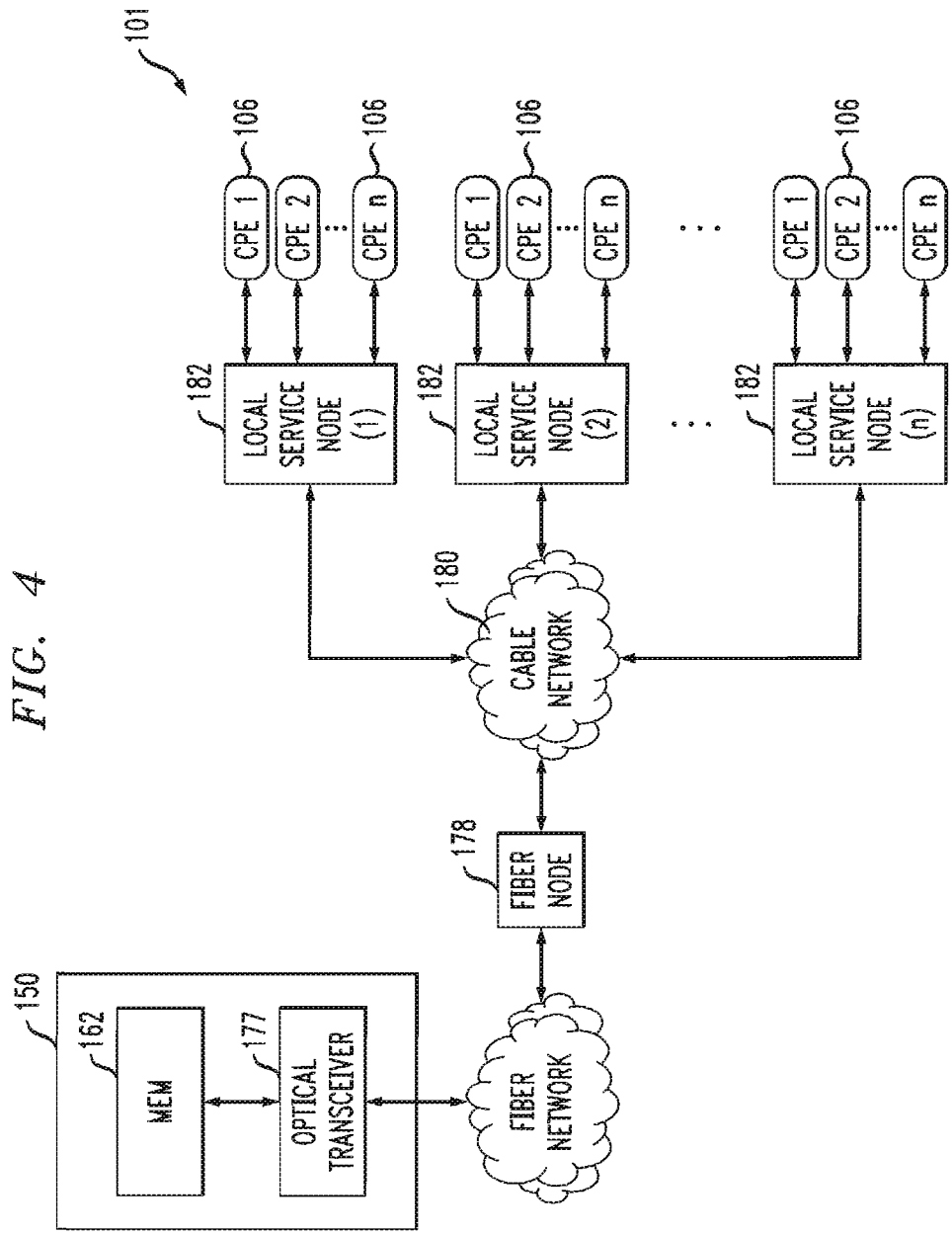
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. The CPE 106 optionally includes a cable modem, such as a DOCSIS-compliant cable modem (DCCM).

In another aspect, the network 101 may be a switched digital network, as known, for example, from US Patent Publication 2003/0056217 of Paul D. Brooks, entitled "Technique for Effectively Providing Program Material in a Cable Television System," the complete disclosure of which is expressly incorporated herein by reference in its entirety for all purposes. The Brooks publication describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1-4 optionally also deliver Internet data services using the Internet protocol (IP), although other protocols and transport mechanisms of the type well known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Again, for the avoidance of doubt, components which may be used in networks which provide high speed data in addition to video content are illustrated for completeness but may be omitted in some instances.

Currently, a cable multi-service operator (MSO) or the like may have a number of video sources into which it injects advertising. Within a region, such as a region served by an RDC 1048, the trend has been to create more and more advertising ("ad") zones so as to have unique advertisements for smaller and smaller segments of the customer population. One challenge associated with this is that in some cases, it is necessary to deploy expensive ad insertion equipment on the edge of the network. In other cases, the equipment is centralized, but it is then necessary to send out multiple copies of the same content with the only difference being that there are different ads inserted therein (e.g., in a current system in use in the Carolinas, there may be 40-50 copies of the same content, differing only in terms of the ads). This is a significant bandwidth driver on regional and metropolitan networks. One or more embodiments advantageously provide techniques to insert ads closer to customers but without the need to deploy additional equipment into the network.

Figure 5:
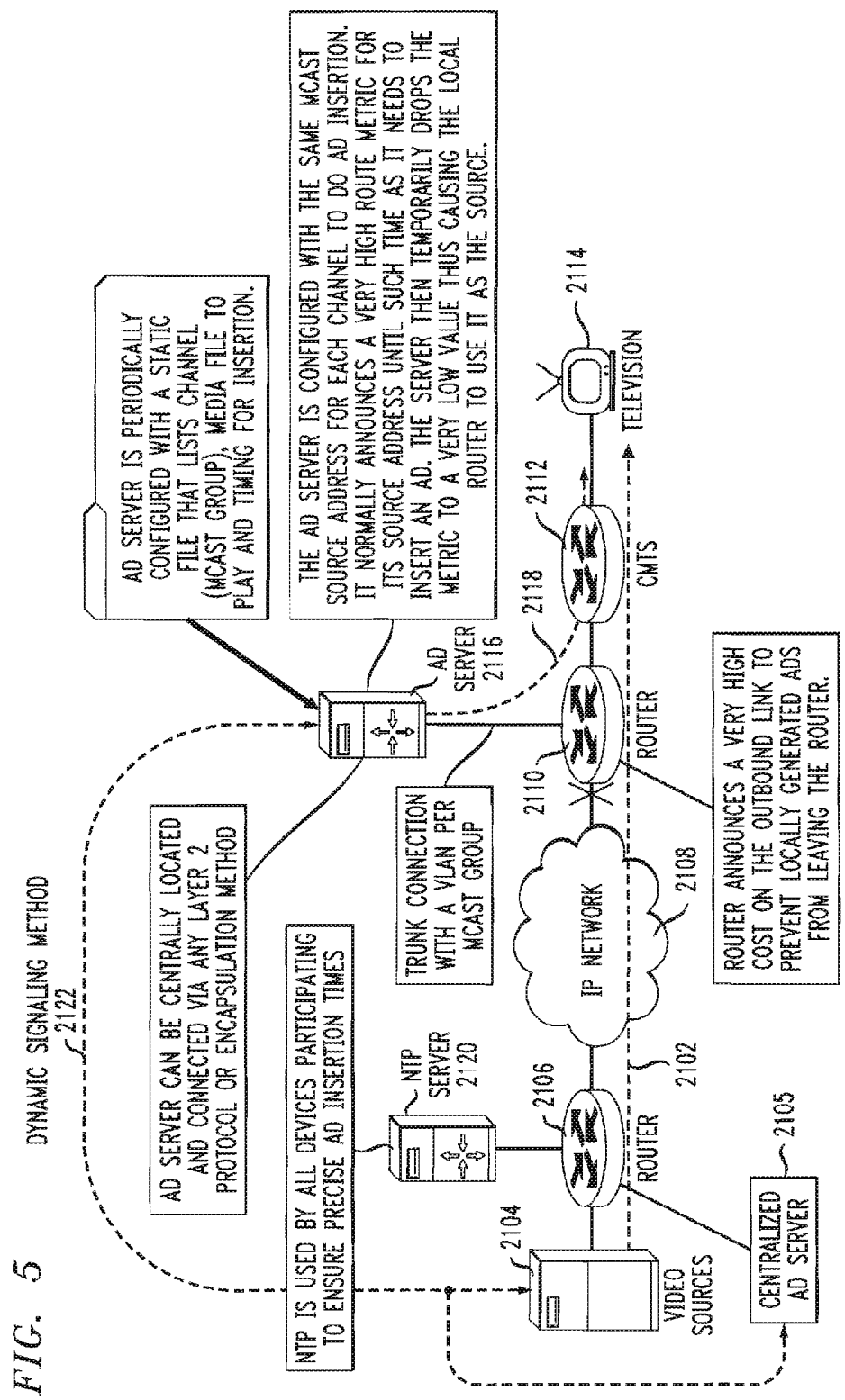
FIG. 5 is a functional block diagram illustrating illustrative apparatuses and a system in accordance with an aspect of the invention.

In one or more embodiments, only one copy of the channel or content is multicast or sent out. Then, using routing protocol techniques, the ads are inserted at the edge of the network without having to deploy any additional physical hardware. Refer now to FIG. 5. Line 2102 depicts normal multicast flow from video sources 2104 (which may be centralized, e.g., in a regional data center 1048) across the IP network 2108. Note router 2106 between video sources 2104 and network 2108. Non-limiting examples of video sources 2104 include Video Servers (VS) 1052 and/or content servers (CS) 1054. A non-limiting example of router 2106 is RDC router 1060. IP network cloud 2108 may include, for example, network 1046 and head ends 150.

To the right of network cloud 2108, router 2110 and CMTS 2112 may be located, for example, in a hub site. A hub site could be located, for example, between head end 150 and HFC network 101 in FIG. 2, in a well-known manner. Television 2114 represents a customer on the HFC plant served off of the hub site wherein router 2110 and CMTS 2112 are located. Television 2114 may have an integral set top terminal (e.g., CPE 106) or may be connected to a separate set top terminal (not separately illustrated, to avoid clutter). Multicast traffic enters hub site router 2110 and is delivered down to the subscriber 2114 through the CMTS 2112. The process described thus far is conventional.

However, one or more embodiments address the time when it is desired to insert an advertisement. Note that ad server 2116 can be located close to the hub site at which router 2110 and CMTS 2112 are located, or can be centralized. Ad server 2116 is also configured with the same multicast source address for each channel that it is expected to carry out ad insertion upon. For each multicast flow, there is the notion, per se familiar to the skilled artisan, of a group address or a group ID and a source address. The group ID or multicast ID essentially identifies the channel and is a special IP address. The source address tells the networking devices where to go to obtain the source information. Normally, router 2110 and CMTS 2112 look to pull the source information from video source 2104 in the RDC.

In one or more embodiments, when it is time for the ad server 2116 to insert an advertisement, server 2116 announces a new metric into the routing domain which in essence states that it (server 2116) has the same source address as the source(s) 2104 in the RDC, but that it (server 2116) is closest to the router 2110 and CMTS 2112 in the network, and consequently is a preferred source for elements 2110, 2112 to obtain the multicast content. Server 2116 only has the ads, not the actual program content. Thus, the actual program is being transmitted normally from source 2104, and then an appropriate signal is sent which indicates that it is time to insert an ad. At this time, the network re-converges quickly and realizes that it should pull the ad from the ad server 2116 and not the source(s) 2104. This is depicted at line 2118. Server 2116 merely serves up the advertisements. Once this is complete, server 2116 withdraws the route announcement which announces itself (server 2116) as the closest source for the content, and traffic then flows from source(s) 2104 in a conventional manner, as initially described with respect to line 2102.

As noted, the ad server 2116 can be located at any place in the network, as long as a suitable connection, such as a layer 2 type connection, can be provided from ad server 2116 down to the hub site router 2110. This can easily be done using, for example, an MPLS (multi-protocol label switching) type protocol. Examples of appropriate layer 2 protocols and encapsulation methods include: (i) a native layer 2 network from the ad server 2116 to the hub site router 2110, or (ii) an appropriate encapsulation method such as MPLS protocols (such as Ethernet) over MPLS, or another layer 2 type encapsulation method such as L2TPv3 (Layer 2 Tunneling Protocol Version 3).

Advantageously, in the example of FIG. 5, there is no need to add additional equipment into the hub site. In a region, such as that served by an RDC 1048, there may be 200 hub sites. Rather than new equipment, all that is required in one or more embodiments is a new software configuration in the router 2110. In one or more embodiments, additional configuration and/or coding is also provided in ad server 2116 to enable it to participate within the routing domain of the network.

Video sources 2104 are preferably in an RDC 1048, as noted. The hub site where router 2110 and CMTS 2112 are located is typically at a lower level than a head end 150. A collection of hub sites are aggregated by a head end 150. Within a region, such as that served by an RDC 1048, there may be, for example, 4-5 head ends. Each of the head ends may have, for example, 30-40 hub sites. The head end is omitted from FIG. 5 but, as noted, would be located within IP network cloud 2108. Router 2106 and NTP server 2120 are also preferably located within the RDC 1048. IP network 2108 is a generalized connection which can include the head end 150, as discussed. Ad server 2116 can exist anywhere with connectivity to the IP network—in the RDC 1048, in a head end 150, at the hub site where router 2110 and CMTS 2112 are located, and so on.

All the components in the solution are preferably synchronized in one way or the other; for example, using a common time source. NTP (network time protocol) server 2120 is preferably provided to ensure that all the devices in the network run off the same clock. The skilled artisan is familiar with NTP servers and how to use same to ensure that all the devices in the network run off the same clock. In other embodiments, cue tones could be employed to signal when it is the appropriate time to insert the ad, as will be discussed further below.

In one embodiment, rather than using a cue tone, periodically provide a file (static list) to ad server 2116 which indicates when it is time for the ad server to announce the values which cause router 2110 and CMTS 2112 to obtain content from ad server 2116 instead of video source(s) 2104. In an alternative approach depicted at 2122, a dynamic signaling technique is employed, such as the aforementioned cue tones or the like. The NTP server 2120 is particularly advantageous in the static list embodiment, so that the devices are synchronized with respect to the correct time to insert the advertisements. By way of example, periodically (in a non-limiting example, at least once a day), send a file to the ad server 2116 which lists particular times (e.g., specific times, such as 01:22 GMT; 12:47 GMT; 15:01 GMT, and so on; so many minutes after every hour (e.g., 1, 13, 27, 44, 55), and so on) to insert certain ads or groups of ads.

With further reference to ad server 2116, when dealing with multicast, two pieces of information are typically required, namely, the "S,G" which stands for the Source (where to obtain the information) and the Group (the ID, which indicates, once the source has been located, what information is to be pulled from the source). Both of these pieces of information are IP addresses. The Source address is the unicast IP address of the Source from which the content is to be obtained, e.g., 10.10.10.10, which resolves or points to source(s) 2104. The Group ID is simply another IP address, analogous to the TV channel number, e.g., 239.239.239.239. In a normal, steady state, the customer 2114 decides to watch, for example, the USA network. The system knows that the USA network is the 239.239.239.239 address and that the source is the 10.10.10.10 address. The request comes up from the television 2114 (e.g., from a set top terminal) to the CMTS 2112 and router 2110. The router 2110 participates in the multicast domain and knows how to get to the 10.10.10.10 address by looking same up in its routing protocol; furthermore, the router 2110 sees that the shortest path is line 2102 back to source(s) 2104. Router 2110 builds a path backwards and the information or content begins to flow downstream to set 2114. Simultaneously, ad server 2116 announces that its IP address is also 10.10.10.10 such that there are two devices in the network with this same IP address (i.e., source(s) 2104 and server 2116). However, server 2116 announces the 10.10.10.10 address with a very high metric. A metric is a number, usually 0 to 255, such that the higher the metric, the less likely it is that the corresponding direction will be chosen to reach the desired source. Purely by way of a simple example, suppose the link between routers 2106 and 2110 has a metric of ten. Furthermore, suppose the link from router 2106 to source(s) 2104 also has a metric of ten. From the hub site router 2110 to source(s) 2104 is thus twenty. Ad server 2116 also advertises a path to 10.10.10.10, but with, say, a metric of two hundred and fifty five. Router 2110 therefore selects the path with the lowest metric and seeks content (program material) from source(s) 2104. However, when server 2116 "knows" (i.e., due to appropriate instructions therein or accessible thereto) it is time to insert an advertisement, it will change its route metric from two hundred and fifty five to, say, a value of one. Router 2110 now perceives a better path to the 10.10.10.10 address, via ad server 2116, and thus stops pulling content from source(s) 2104 and instead obtains content (advertisements) from server 2116. When the ads are finished, server 2116 again advertises the path of two hundred and fifty five, causing router 2110 to again obtain content from source(s) 2104. This process is preferably transparent to the viewer of set 2114.

As used herein, a "route metric" is a value used by a router to determine whether a given route to a destination is superior (or more desirable) to another. The result of this decision is used by the router to forward a packet or make other network routing or policy decisions. The route metric typically describes the whole route from a single router's point of view. For example, an observer "sitting on" router 2110 will see a metric that describes a route encompassing everything between router 2110 and, for example, router 2106. For an observer "sitting on" a node within network 2108, the metric will appear differently but still describe the route to destination 2106. Thus, in one or more embodiments, ad server 2116 announces a metric that overrides what router 2110 would normally receive from the rest of the network.

Ad server 2116 is preferably interconnected with router 2110 via a VLAN (virtual local area network). The skilled artisan is familiar with VLANs per se. A simple example would be a home network with a home gateway router, personal computer (PC), and printer all sharing a common LAN. In the VLAN technology, multiple LANs can exist on the same wire or cable. The all operate independently, seeming like their own layer 2 type home network, but they cannot see each other's traffic.

In one or more embodiments, techniques to pull content from different directions by changing the routing metrics are implemented at layer 3 of the network, i.e., the routing portion of the network. Accordingly, embodiments of the invention do not require changing a VLAN ID for the consumer of the video or data so that he or she is temporarily on a different VLAN and is fed the ads in that way. The skilled artisan will be familiar with the O.S.I. (O.S.I.—Open System Interconnection) model, which model sub-divides a system into layers.

Note that in one or more embodiments, the advertising material on server 2116 may be changed on a periodic basis, such as daily, weekly, or so on, by periodically copying the ads over to the server 2116. In some instances, the ads are copied to ad server 2116 from centralized ad server 2105. Such centralized ad server may, for example, be coupled to router 2106 for communication over network 2108 and may also carry out dynamic signaling method 2122 in lieu of or in combination with video source 2104. Centralized ad server 2105 can, in at least some embodiments, also provide the aforementioned file (static list) to ad server 2116.

The aforementioned cue tones may, in some instances, be segmentation messages formatted in accordance with, for example, the ANSI/SCTE 35 standard for Digital Program Insertion Cueing Message for Cable, promulgated by the Society of Cable Telecommunications Engineers and the American National Standards Institute, and formerly known as the DVS-253 (ANSI/SCTE 35 2001) cueing standard. A segmentation message may be in the form of a packet delineated by a sync byte, which is a byte that is unlikely to be replicated in the program stream. Appropriate fields may follow the sync byte, separated by commas. Segmentation messages may be provided over a single channel for all programs in a multiplex. The ANSI/SCTE 35 standard is hereby incorporated by reference in its entirety for all purposes. In some instances, centralized ad server 2105 "sees" (i.e., monitors) all the traffic on path 2102 and detects cue tones; when a cue tone is detected for a particular stream, centralized ad server 2105 sends a signal to ad server 2116 as shown at 2122 to announce the alternate route metric. Video coming into the system from video sources 2104 may have cue tones embedded therein, which tones are detected by centralized ad server 2105 causing it to signal ad server 2116 as just described. However, video source 2104 could also carry out detection of the cue tones and/or implement dynamic signaling to ad server 2116.

In another dynamic signaling aspect, instead of cue tones, special signaling packets are embedded in the video source files and the video server detects same shortly before it is ready to play them out, triggering the dynamic signaling 2122 to ad server 2116.

One or more embodiments of the invention thus provide a dynamic method for inserting content into multicast video streams using simple routing protocols. By manipulating routing protocol metrics at the appropriate time, consumers of multicast video streams can be presented different video content (advertisements) without adjusting their playback devices. This is preferably achieved without requiring any changes to existing network or client hardware or software design. One or more embodiments are useful for inserting targeted advertisements into multicast video streams to multiple groups of consumers without requiring the stream to be replicated many times over for each group. One or more embodiments can also be employed to insert broadcast messages of all types including those of an emergency nature as well as maintenance reminders. One or more embodiments eliminate the need to replicate a multicast video stream for each target audience group just because they need to be presented different advertising material for the same video content.

One or more embodiments do not require the layer 2 network between CMTS 2112 and subscriber 2114 to be modified. One or more embodiments utilize layer 3 network routing protocols and will work on both a layer 2 and layer 3 network. One or more embodiments provide a methodology of an actual ad insertion process.

Within a regional network of an MSO, there may be forty or more unique ad zones. An ad zone is defined as a collection of video customers that should receive similar advertising. For example a local restaurant owner may only desire to advertise to viewers within the immediate local area around his or her establishment and not to viewers across town who would be less likely to visit. The restaurant would accomplish this by advertising only in the appropriate ad zone(s).

In current techniques, while the underlying video content may be the same television show or movie, it is being delivered via a unique multicast stream to each ad zone because the content is different during advertising breaks. As the number of advertising zones is increased, the consumption of bandwidth on the network also increases proportionally as the additional multicast streams are created. By inserting advertisements as close to the edge as possible, the overall number of multicast streams required is reduced. Typically, with current techniques, this requires placing expensive ad insertion devices at each location. With large numbers of ad zones this becomes cost prohibitive.

One or more embodiments allow the insertion of new video content to a customer by manipulating routing metrics in real time to pull content from alternative source(s). This source can be located anywhere in the network where desired by the operator and does not require any special ad insertion hardware to be deployed. Through the use of an "anycast" model, all possible video sources for a specific multicast group, channel, share a common source IP address. By changing routing protocol metrics, a customer will automatically pull content from the desired source without any user intervention. By using this technique, a single multicast stream can be transmitted and shared across as many ad zones as required without requiring costly replication of the same content.

Furthermore, one or more embodiments allow centralizing ad insertion devices to hardened facilities staffed with appropriately skilled technicians to support them.

Figure 6:
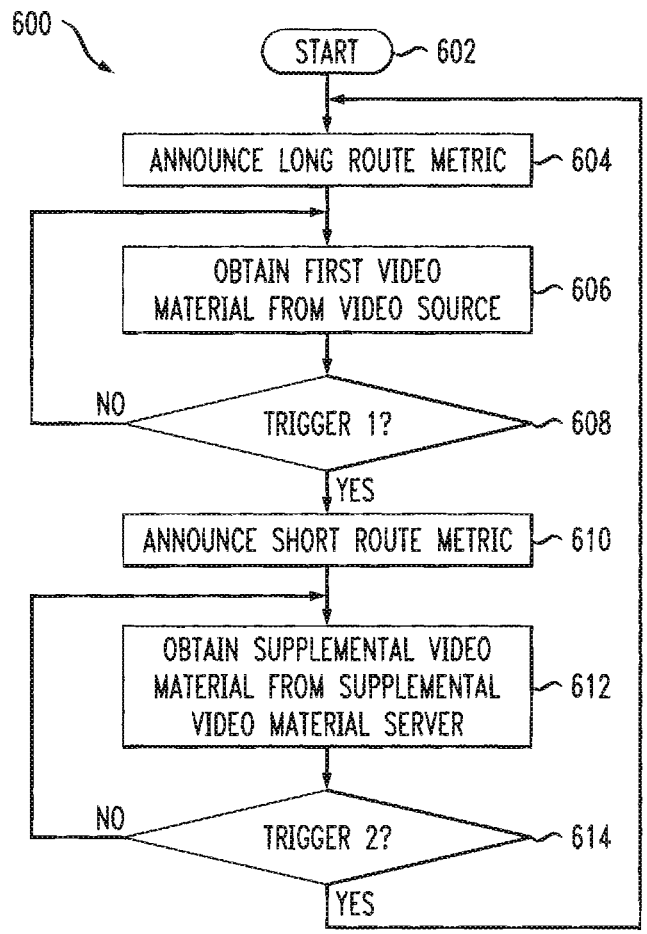
FIG. 6 is a flow chart of exemplary method steps according to another aspect of the invention.

Attention should now be given to flow chart 600 of FIG. 6, which begins at step 602. Given the description thus far, it will be appreciated that, in general terms, an exemplary method, according to an aspect of the invention, includes the step of transmitting first video material, from a video source 2104, over a video content network 2108, to consumer premises equipment 106 and/or 2114, via a hub router 2110. The video source has a source address and there is a first path length between the hub router and the video source. During at least a portion of this step, first video material may be obtained by the CPE from the video source, as shown at step 606 (for example, because the supplemental video material server (e.g., ad server 2116) is announcing the long route metric, as at step 604). Note that in the general case, source 2104 may or may not continuously transmit first video material regardless of which route metric is announced by the supplemental video material server (e.g., ad server 2116). However, it is preferred that source 2104 does continue to transmit first video material regardless of which route metric is announced, inasmuch as, in case of a problem with local ad insertion, rather than no signal, the consumer will then see a national instead of a local ad.

In a further step 610, upon occurrence of a first triggering condition (e.g., "YES" branch of block 608), announce, from the supplemental video material server (e.g., ad server 2116) coupled to the hub router 2110, a short route metric which causes the hub router to perceive a second path length, between the hub router and the supplemental video material server, as shorter than the first path length. Note that the supplemental video material server has a source address identical to the source address of the video source. This causes the consumer premises equipment to obtain supplemental video material from the supplemental video material server instead of first video material from the video source, as shown at 612. If the first trigger does not occur (e.g., "NO" branch of block 608), continue to obtain first video material from the video source, as shown at step 606.

In an optional but preferred aspect, upon occurrence of a second triggering condition (e.g., "YES" branch of block 614), again announce, from the supplemental video material server coupled to the hub router, the long route metric, as at 604, which causes the hub router to perceive the second path length, between the hub router and the supplemental video material server, as longer than the first path length, such that the consumer premises equipment again obtains first video material from the video source, as at 606, instead of supplemental video material from the supplemental video material server, as at 612. If the second trigger does not occur (e.g., "NO" branch of block 614), continue to obtain supplemental video material from the supplemental video material server, as at 612. Note that, as used herein, including the claims, the second triggering event may be explicit or implicit (an example of the latter would be a ceasing or expiration of the first triggering event).

In some instances, at least one of the first and second triggering conditions includes occurrence of a certain time in a list accessible to the supplemental video material server. In another aspect, at least one of the first and second triggering conditions could include receipt of a triggering signal (such as at 2122) by the supplemental video material server. The signal could come, for example, from video source 2104 and/or a centralized supplemental video material server, such as centralized ad server 2105.

As noted, in some instances, during the step of transmitting the first video material from the video source, and prior to the first triggering condition, the supplemental video material server announces the long route metric as at 604 (again, throughout this application, including the claims (unless stated to the contrary), the first video material from the video source may, in at least some instances, be continuously transmitted, even when the short route metric is announced).

In one or more instances, the first video material comprises program material, the supplemental video material comprises advertising material, and/or the supplemental video material server comprises an advertisement server 2116 (if present, a centralized supplemental video material server as discussed elsewhere may, in some instances, be a supplemental ad server 2105).

In another aspect, an exemplary system, according to an aspect of the invention, includes a video source 2104 having a source address, a video content network 2108, a hub router 2110 having a first path length to the video source, and consumer premises equipment (e.g. 106 and/or 2114) coupled to the video source over the video content network, via the hub router. The system also includes a supplemental video material server, such as ad server 2116, coupled to the hub router and having a source address identical to the source address of the video source. The video source is configured to transmit first video material, over the video content network, to the consumer premises equipment, via the hub router. The supplemental video material server is configured to announce the long and/or short route metrics as described above. The video source can be located, for example, in a regional data center 1048 of an operator of the video content network.

In some instances, the system includes a centralized supplemental video material server, such as centralized ad server 2105, which can provide the dynamic signaling 2122 and/or provide the supplemental video material to supplemental video material server 2116 at appropriate times for storage thereon.

In still another aspect, a computer program product includes a tangible computer readable recordable storage medium as described further below. The medium includes computer usable program code, executable on at least one processor of a supplemental video material server, configured to cause the at least one processor of the supplemental video material server to announce the long and/or short route metrics as described above.

In an even further aspect, a supplemental video material server includes a memory, at least one processor coupled to the memory, and the aforementioned tangible computer readable recordable storage medium. Such a supplemental video material server could, for example, include hardware made available from a vendor who would bundle the hardware together with the software on the aforementioned tangible computer readable recordable storage medium. In another aspect, the vendor may only provide hardware and the software on the aforementioned tangible computer readable recordable storage medium may be provided by the MSO or another party.

System and Article of Manufacture Details

The invention can employ hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media). Appropriate interconnections via bus, network, and the like can also be included.

Figure 7:
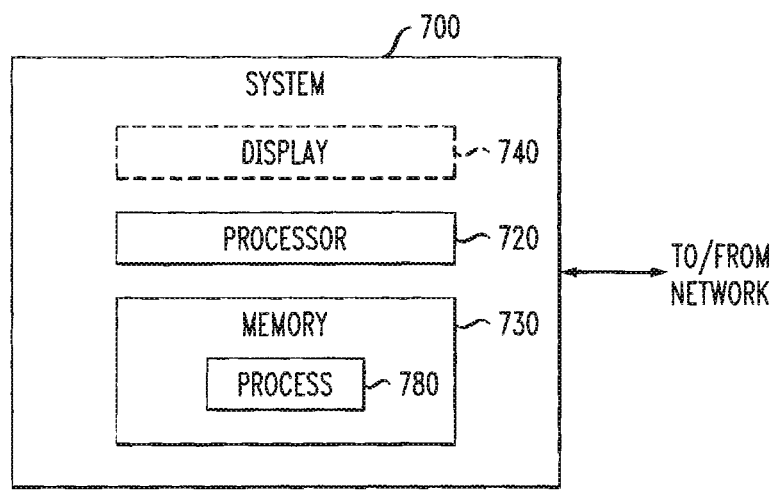
FIG. 7 is a block diagram of a computer system useful in connection with one or more aspects of the invention.

FIG. 7 is a block diagram of a system 700 that can implement part or all of one or more aspects or processes of the present invention, processor 720 of which is representative of processors associated with servers, clients, set top terminals, controllers, and other elements with processing capability depicted in the other figures. In one or more embodiments, inventive steps are carried out by one or more of the processors in conjunction with one or more interconnecting network(s).

As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors. In one or more embodiments, in addition to a server or other general purpose computer, some steps are carried out by a processor or processors of a router.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The elements described herein each typically contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on server 2116 and/or server 2104 or 2105, and that such program may be embodied on a tangible computer readable recordable storage medium.

As used herein, including the claims, a "server" includes a physical data processing system (for example, system 700 as shown in FIG. 7) running a server program. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. supplemental material server module or ad server module to announce different metrics based on triggers; module in or associated with server 2104 and/or server 2105 to detect cue tones or the like, generate and/or send triggers, and so on; module on router 2110 to pick apparently shortest route). The method steps can then be carried out using the distinct software modules of the system, as described above, executing on the one or more hardware processors (e.g., a processor or processors in the server 2116, server 2104 and/or server 2105, and/or router 2110, and so on). Further, a computer program product can include a tangible computer-readable recordable storage medium with code adapted to be executed to carry out one or more method steps described herein, including the provision of the system with the distinct software modules. In one or more embodiments, the code is stored in a non-transitory manner.

Non-limiting examples of languages that may be used include markup languages (e.g., hypertext markup language (HTML), extensible markup language (XML), standard generalized markup language (SGML), and the like), C/C++, assembly language, Pascal, Java, EBIF—Extended Binary Interchange Format language, UNIX shell scripts (for example, to generate information to supply to a controller), and the like. Note that EBIF would typically only be employed in connection with a set-top box. RTSP and/or RPC can be employed for interface protocols, for example. Furthermore, non-limiting examples of useful database software include Oracle software (registered mark of Oracle International Corporation, 500 Oracle Parkway, Redwood City, Calif. 94065, USA); Informix software (registered mark of International Business Machines Corporation, Armonk, N.Y., USA); and structured query language (SQL) software available from many sources, including Microsoft Corporation, Redmond, Wash., USA).

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

System(s) have been described herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). Aspects of one or more blocks, components, sub-blocks, sub-components, modules and/or sub-modules may be realized by one or more DSPs. A DSP typically comprises a combination of digital logic devices and other components, which may be a state machine or implemented with a dedicated microprocessor or micro-controller running a software program or having functions programmed in firmware.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   transmitting a signal including first video material, from a video source, over a video content network, to consumer premises equipment, via a hub router, wherein said video source has a source address and wherein there is a first path length between said hub router and said video source; and
   controlling, by a supplemental video material server coupled to said hub router, an insertion of supplemental video material into said signal obtained by said consumer premises equipment upon occurrence of a first triggering condition by announcing a short route metric from said supplemental video material server, said short route metric which causes said hub router to perceive a second path length, between said hub router and said supplemental video material server, as shorter than said first path length, said supplemental video material server having a source address identical to said source address of said video source, such that said consumer premises equipment obtains said supplemental video material from said supplemental video material server instead of said first video material from said video source.

2. The method of claim 1, further comprising, upon occurrence of a second triggering condition, announcing, from said supplemental video material server coupled to said hub router, a long route metric which causes said hub router to perceive said second path length, between said hub router and said supplemental video material server, as longer than said first path length, such that said consumer premises equipment again obtains first video material from said video source instead of supplemental video material from said a supplemental video material server.

3. The method of claim 2, wherein said first video material is continually transmitted from said video source during the insertion of said supplemental video material into said signal.

4. The method of claim 3, wherein: said first video material comprises program material, said supplemental video material comprises advertising material, and said supplemental video material server comprises an advertisement server.

5. The method of claim 3, wherein at least one of said first and second triggering conditions comprises occurrence of a certain time in a list accessible to said supplemental video material server.

6. The method of claim 3, wherein at least one of said first and second triggering conditions comprises receipt of a triggering signal by said supplemental video material server.

7. The method of claim 6, further comprising providing said triggering signal to said supplemental video material server from at least one of:
   said video source; and
   a centralized supplemental video material server.

8. The method of claim 1, further comprising, upon occurrence of a second triggering condition, withdrawing said announcement of said short route metric by said supplemental video material server such that said consumer premises equipment again obtains first video material from said video source instead of supplemental video material from said a supplemental video material server.

9. A system comprising:
   a video source having a source address;
   a video content network;
   a hub router having a first path length to said video source;
   consumer premises equipment coupled to said video source over said video content network, via said hub router; and
   a supplemental video material server coupled to said hub router and having a source address identical to said source address of said video source;
   wherein:
      said video source is configured to transmit a signal including first video material, over said video content network, to said consumer premises equipment, via said hub router; and
      said supplemental video material server is configured to control an insertion of supplemental video material into said signal obtained by said consumer premises equipment upon occurrence of a first triggering condition by announcing a short route metric which causes said hub router to perceive a second path length, between said hub router and said supplemental video material server, as shorter than said first path length, such that said consumer premises equipment obtains said supplemental video material from said supplemental video material server instead of said first video material from said video source.

10. The system of claim 9, wherein said supplemental video material server is further configured to announce, upon occurrence of a second triggering condition, a long route metric which causes said hub router to perceive said second path length, between said hub router and said supplemental video material server, as longer than said first path length, such that said consumer premises equipment again obtains said first video material from said video source instead of said supplemental video material from said supplemental video material server.

11. The system of claim 10, wherein said supplemental video material server is further configured to announce, during said transmitting said first video material from said video source, and prior to said first triggering condition, said long route metric.

12. The system of claim 11, wherein said first video material comprises program material, said supplemental video material comprises advertising material, and said supplemental video material server comprises an advertisement server.

13. The system of claim 11, wherein at least one of said first and second triggering conditions comprises occurrence of a certain time in a list accessible to said supplemental video material server.

14. The system of claim 11, wherein at least one of said first and second triggering conditions comprises receipt of a triggering signal by said supplemental video material server.

15. The system of claim 14, wherein said triggering signal is provided to said supplemental video material server from said video source.

16. The system of claim 14, further comprising a centralized supplemental video material server, wherein said triggering signal is provided to said supplemental video material server from said centralized supplemental video material server.

17. The system of claim 11, wherein said video source is located in a regional data center of an operator of said video content network.

18. The system of claim 9, further comprising a centralized supplemental video material server which is coupled to said supplemental video material server and provides said supplemental video material thereto.

19. A computer program product comprising a non-transitory, tangible computer readable recordable storage medium including computer usable program code, executable on at least one processor of a supplemental video material server, the computer usable program code being configured to cause said at least one processor of said supplemental video material server to control an insertion of supplemental video material into a signal including first video material obtained by a consumer premises equipment by announcing, upon occurrence of a first triggering condition, a short route metric from said supplemental video material server, said short route metric which causes a hub router coupled to a video content network to perceive a second path length, between said hub router and said supplemental video material server, as shorter than a first path length, between said hub router and a video source, such that said consumer premises equipment coupled to said hub router obtains supplemental video material from said supplemental video material server instead of said first video material from said video source.

20. The computer program product of claim 19, further comprising computer usable program code configured to cause said at least one processor of said supplemental video material server to announce, upon occurrence of a second triggering condition, a long route metric which causes said hub router to perceive said second path length, between said hub router and said supplemental video material server, as longer than said first path length, such that said consumer premises equipment obtains said first video material from said video source instead of said supplemental video material from said supplemental video material server.

21. The computer program product of claim 20, further comprising computer usable program code configured to cause said at least one processor of said supplemental video material server to announce, during transmitting of first video material from said video source, and prior to said first triggering condition, said long route metric.

22. The computer program product of claim 21, wherein said first video material comprises program material, said supplemental video material comprises advertising material, and said supplemental video material server comprises an advertisement server.

23. The computer program product of claim 21, wherein at least one of said first and second triggering conditions comprises occurrence of a certain time in a list accessible to said supplemental video material server, further comprising computer usable program code configured to cause said at least one processor of said supplemental video material server to access said list.

24. The computer program product of claim 21, wherein at least one of said first and second triggering conditions comprises receipt of a triggering signal by said supplemental video material server, further comprising computer usable program code configured to cause said at least one processor of said supplemental video material server to act upon said triggering signal.

25. An apparatus comprising:
means for transmitting a signal including first video material, from a video source, over a video content network, to consumer premises equipment, via a hub router, wherein said video source has a source address and wherein there is a first path length between said hub router and said video source; and
means for, controlling, by a supplemental video material server coupled to said hub router, an insertion of supplemental video material into said signal obtained by said consumer premises equipment upon occurrence of a first triggering condition by announcing a short route metric from said supplemental video material server, said short route metric which causes said hub router to perceive a second path length, between said hub router and said supplemental video material server, as shorter than said first path length, said supplemental video material server having a source address identical to said source address of said video source, such that said consumer premises equipment obtains said supplemental video material from said supplemental video material server instead of said first video material from said video source.

26. The apparatus of claim 25, further comprising means for, upon occurrence of a second triggering condition, announcing, from said supplemental video material server coupled to said hub router, a long route metric which causes said hub router to perceive said second path length, between said hub router and said supplemental video material server, as longer than said first path length, such that said consumer premises equipment again obtains first video material from said video source instead of supplemental video material from said a supplemental video material server.

27. The apparatus of claim 26, further comprising means for causing said first video material to be continually transmitted from said video source during the insertion of said supplemental video material into said signal.

28. The apparatus of claim 27, wherein: said first video material comprises program material, said supplemental video material comprises advertising material, and said supplemental video material server comprises an advertisement server.

29. The apparatus of claim 27, wherein at least one of said first and second triggering conditions comprises occurrence of a certain time in a list accessible to said supplemental video material server.

30. The apparatus of claim 27, wherein at least one of said first and second triggering conditions comprises receipt of a triggering signal by said supplemental video material server.

31. The apparatus of claim 30, further comprising means for providing said triggering signal to said supplemental video material server from at least one of:
said video source; and
a centralized supplemental video material server.

32. A supplemental video material server for coupling, via a video content network, to a hub router, consumer premises equipment, and a video source, said supplemental video material server having a source address identical to a source address of the video source, said supplemental video material server comprising:
a memory;
at least one processor, coupled to said memory; and
a tangible, computer-readable recordable storage medium, including computer usable program code, loadable into said memory and executable on said at least one processor, the computer usable program code being configured to cause said at least one processor to control an insertion of supplemental video material into a signal including first video material obtained by the consumer premises equipment by announcing, upon occurrence of a first triggering condition, a short route metric from said supplemental video material server, said short route metric which causes the hub router to perceive a second path length, between the hub router and said supplemental video material server, as shorter than a first path length, between the hub router and the video source, such that the consumer premises equipment coupled to the hub router obtains said supplemental video material from said supplemental video material server instead of said first video material from the video source.

33. The supplemental video material server of claim 32, further comprising computer usable program code configured to cause said at least one processor of said supplemental video material server to announce, upon occurrence of a second triggering condition, a long route metric which causes the hub router to perceive said second path length, between the hub router and said supplemental video material server, as longer than said first path length, such that the consumer premises equipment obtains said first video material from the video source instead of said supplemental video material from said supplemental video material server.

\* \* \* \* \*